Patented Aug. 14, 1945

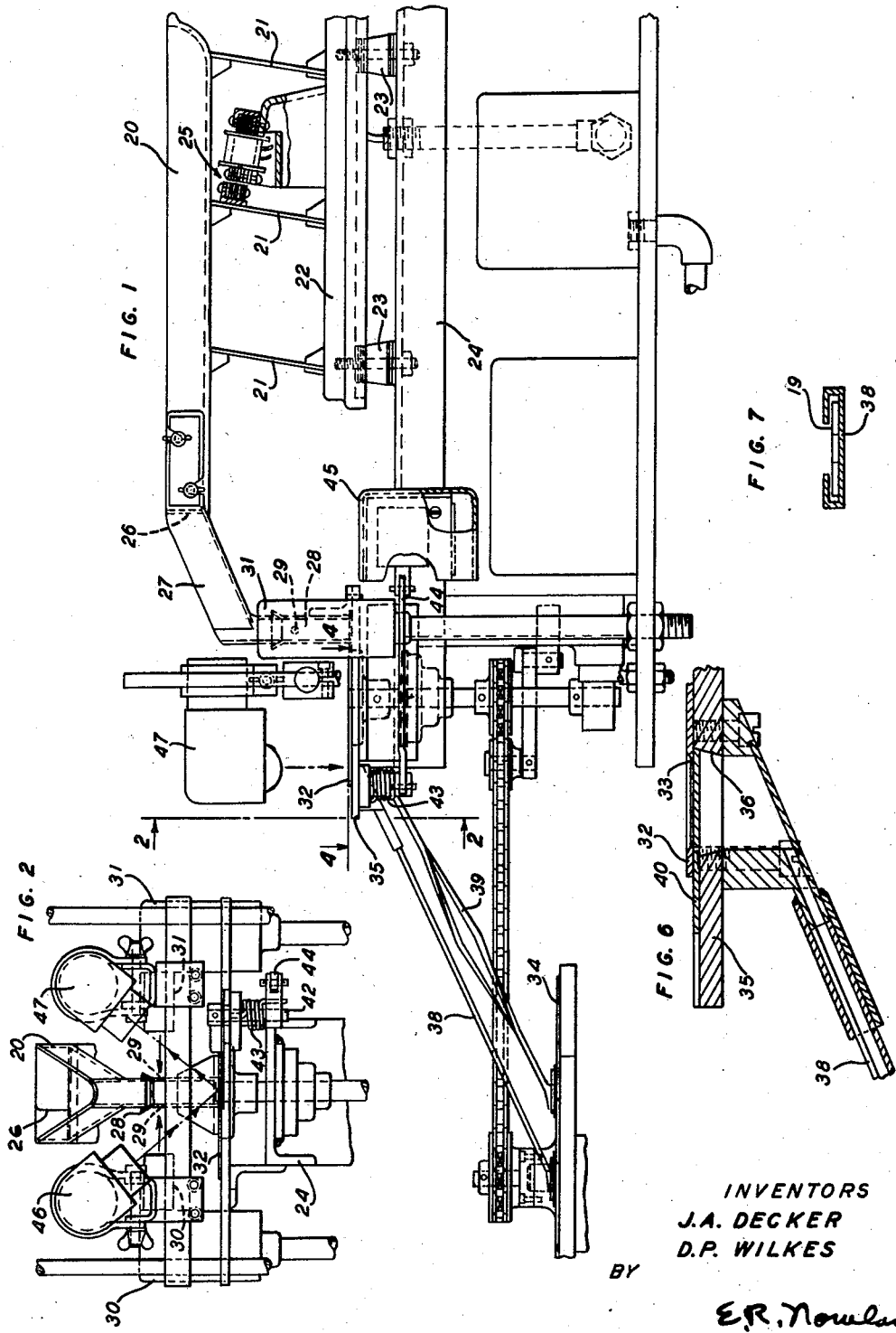

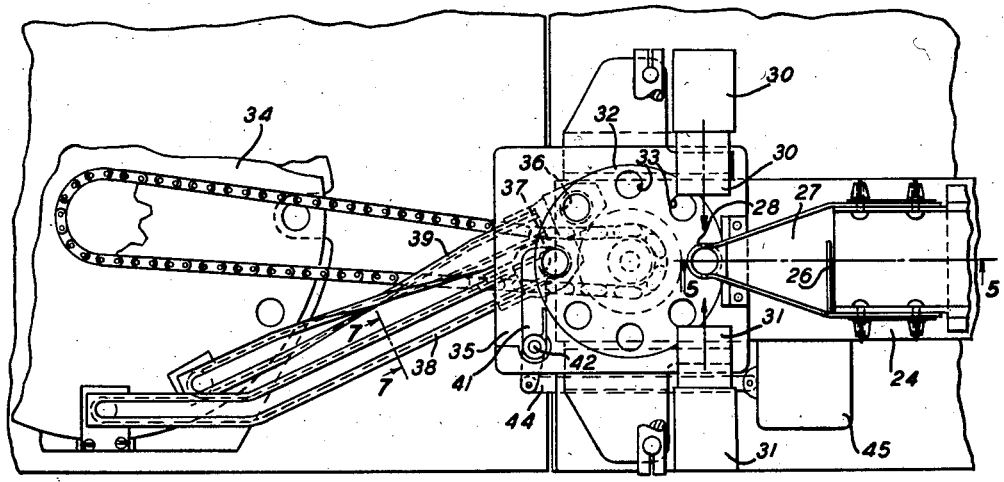
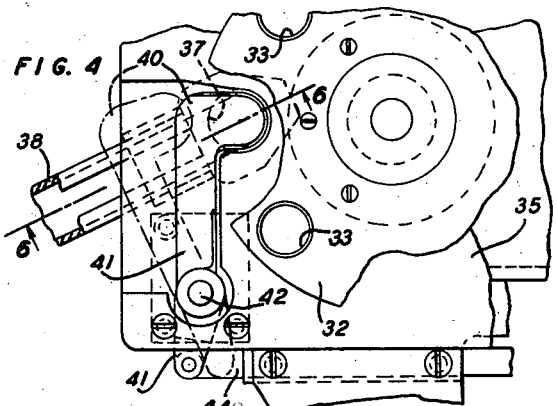
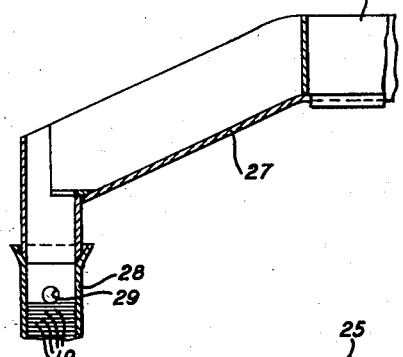
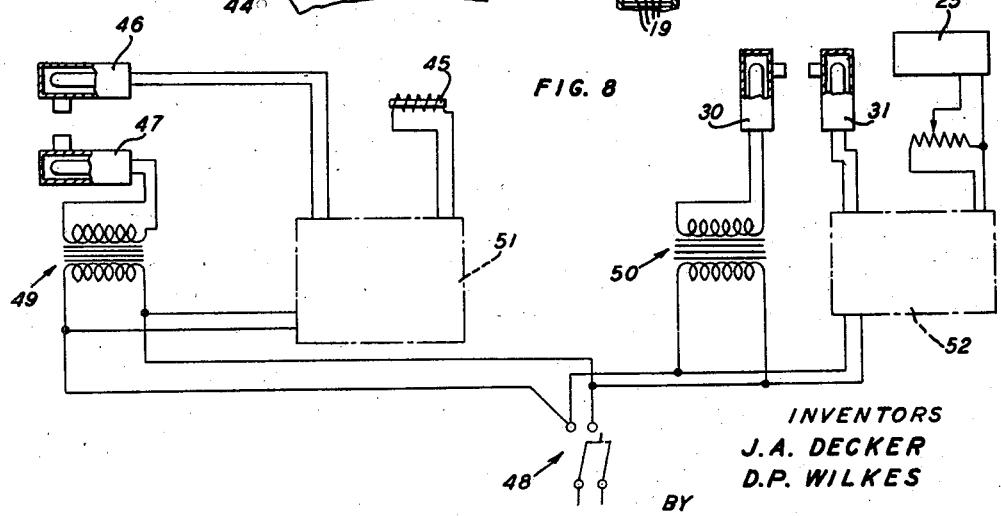
INVENTORS
J. A. DECKER
D. P. WILKES

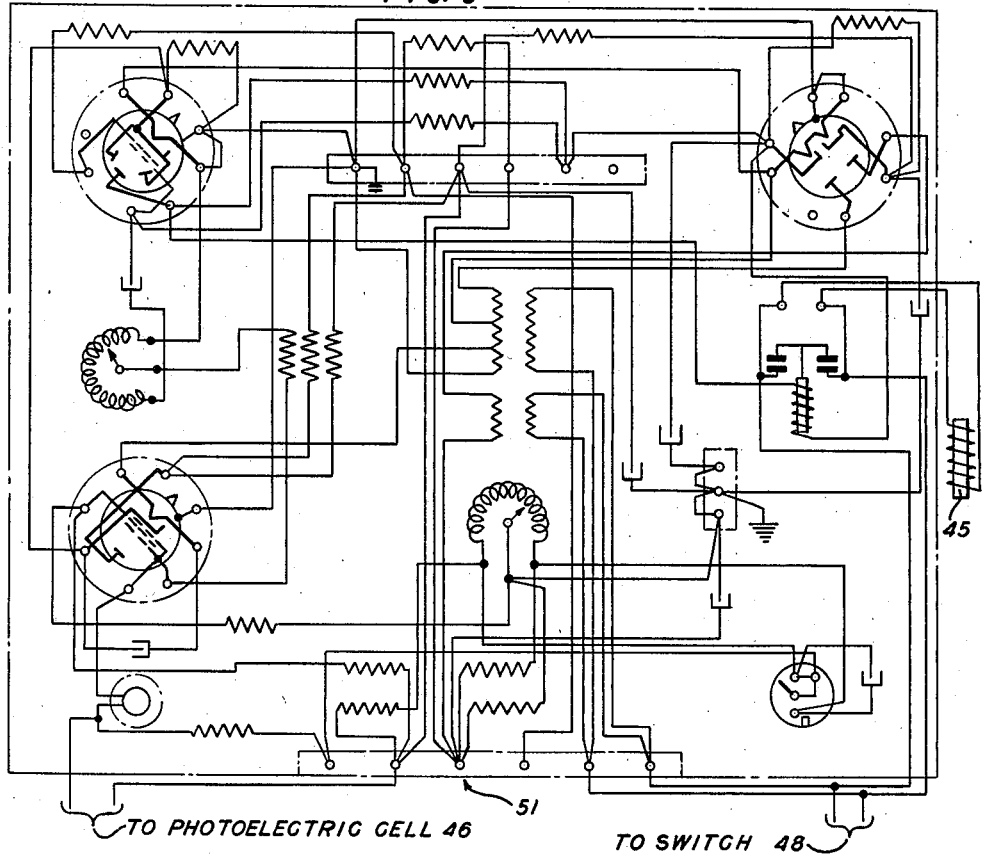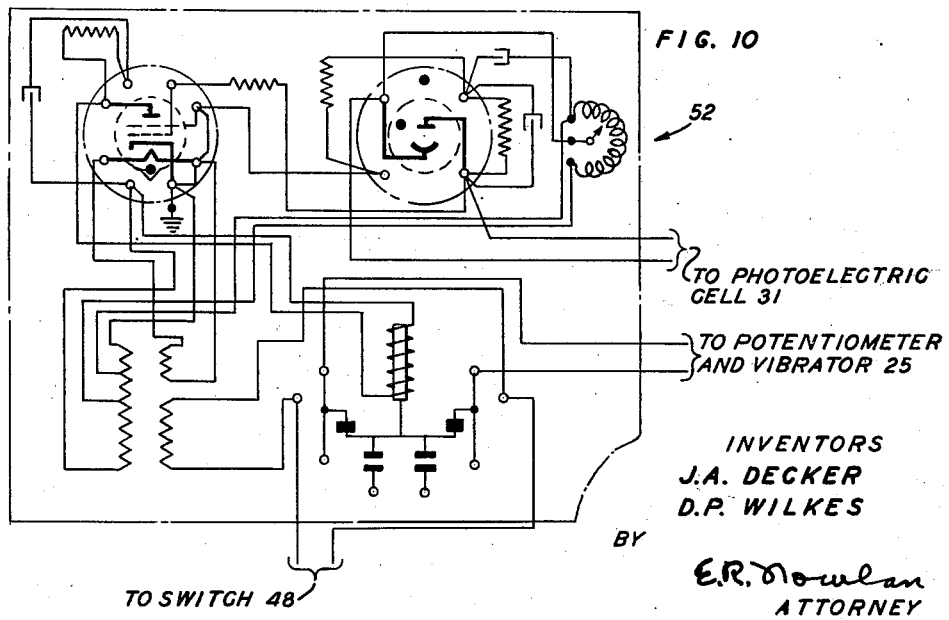

2,382,863

UNITED STATES PATENT OFFICE 2,382,863

ARTICLE HANDLING APPARATUS

John A. Decker, Bayonne, and Donald P. Wilkes, Raritan Township, Middlesex County, N. J., assignors to Western Electric Company, Incorporated, New York, N. Y., a corporation of New York Application March 2, 1943, Serial No. 477,712

5 Claims. (Cl. 209—111)

This invention relates to article handling apparatus and more particularly to apparatus for inspecting laminar articles having sides of different light reflecting power, and delivering these in sequence with the same side up.

Of recent years increasing use has been made in the electrical arts of so-called copper oxide discs, which are centrally perforated circular discs or flat annuli of metallic copper with an adherent film or coating of copper oxide covered with silver or other not copper colored metal on one flat face only. In the large scale manufacture of electrical apparatus containing such discs as elements, it is frequently desirable to arrange a helter-skelter quantity of such discs and deliver them in such fashion that all have the same side up.

An object of the present invention is to provide an apparatus to receive a quantity of laminar articles having sides of different color reflecting power and dumped helter-skelter into the apparatus, and deliver the same all the same side up.

With the above and other objects in view, the invention may be embodied in an apparatus to receive and deliver laminar articles and comprising a hopper to receive a quantity of the articles and having a delivery chute, vertical stacking means to receive articles from the hopper and stack the same either side up in an aligned column, conveyor means to remove articles from the bottom of the column one at a time, photoelectric means to scan the articles on the conveyor in turn, a chute to receive right side up articles from the conveyor, a chute to receive wrong side up articles from the conveyor and twisted to turn the articles over, and gate means actuable by the photoelectric means to admit articles from the conveyor to one chute or the other according to the reaction of the photoelectric means to the light reflecting power of an article scanned thereby.

Other objects and features of the invention will appear from the following detailed description of one embodiment thereof taken in connection with the accompanying drawings in which the same reference numerals are applied to identical parts in the several figures and in which Fig. 1 is a view in side elevation of an apparatus constructed in accordance with the invention;

Fig. 2 is a view on the line 2—2 of Fig. 1;

Fig. 3 is a partial plan view of the showing of Fig. 1;

Fig. 4 is an enlarged view of part of the showing of Fig. 3;

Fig. 5 is an enlarged section on the line 5—5 of Fig. 3;

Fig. 6 is an enlarged section on the line 6—6 of Fig. 4;

Fig. 7 is an enlarged section on the line 7—7 of Fig. 3;

Fig. 8 is a wiring diagram of the general photoelectric control system;

Fig. 9 is a wiring diagram of the specific article directing control, and

Fig. 10 is a wiring diagram of the specific hopper vibration control.

The apparatus herein disclosed as an illustrative embodiment of the invention has for its principal purpose and use to receive copper oxide discs, so-called, thrown helter-skelter into a hopper, and to deliver these in regular sequence all the same side up and horizontal upon a receiving element. The discs in question are in fact, flat annuli of metallic copper having, on one flat face only, an adherent film of copper oxide covered with a coating of silver or other non-copper colored metal, so that the two faces of each disc are different in their power to reflect or absorb light.

The discs to be handled are dumped into a relatively long and narrow, trough-like hopper 20, with a flat bottom which is substantially horizontal longitudinally and is tilted at a small angle transversely toward the delivery corner of the hopper, at the left rear in Figs. 1 and 3. The hopper is supported on upstanding resilient legs 21 leaning at a small angle from the vertical and away from the delivery end of the hopper. The transverse tilt of the hopper is very small, a degree or two of inclination being sufficient. The legs 21 are supported on a horizontal base 22 which, in turn, is supported by vibration muffling blocks 23 of soft rubber or the like, resting on a suitable table member 24 of the apparatus frame. An electrical vibrator device 25 is mounted on the base 22 and mechanically connected to one or more of the legs 21 to cause the legs 21 to be drawn a small distance back and down and released again in rapid succession when the vibrator 25 is energized. Because of the angle of the legs 21 and the inertia of the discs in the hopper, the hopper shifts back under the discs at each rightward and downward motion of the hopper and carries the discs leftward at each return. Being also shaken up on each other by this action, the discs are distributed over the floor of the hopper as they advance toward its delivery end.

Arriving thus at the delivery end of the hopper, the discs pass singly or in superimposed pairs or triplets through an opening left by a fixed gate 26 (Fig. 3) extending partway across the end of the hopper, the opening being only a trifle wider than the diameter of a disc. The discs slide down an inclined chute 27 and fall into a stationary vertical magazine tube 28 formed near its top with two small diametrically opposed apertures 29, 29. A suitable electric light source 30 directs a beam of light horizontally through the apertures to fall on a photoelectric cell unit 31, so that when and if the magazine tube 28 becomes filled with discs above the apertures 29, the unit 31 may act, as hereinafter described, to stop the vibrator 25, and to start this again when the column of discs in the magazine sinks below the apertures 29 and leave the light path clear.

A turntable 32, having a peripheral sequence of apertures 33 located to pass in turn under the bottom end of the magazine tube 28, is driven in step-by-step rotation by any suitable means partially shown, e. g. by sprocket and chain connection to another dial plate 34 driven step-by-step by suitable means, not shown. The turntable 32 is of the same thickness as the discs 19 stacked in the magazine and the apertures 33 in the turntable are of such diameter and shape as to just receive and contain one disc apiece easily. Hence, as the turntable rotates, it picks off and carries away the discs one by one from the bottom of the magazine. The turntable rests on and revolves over a stationary table 35, in which are two apertures 36 and 37, located and spaced to coincide, at each stoppage of the step-by-step motion of the table 32, with two consecutive apertures 33 of the table 32. The apertures 36 and 37 are slightly funnelled and a little larger than the apertures 33 so that when an aperture 33 is aligned with the aperture 36 or 37, a disc in the former can fall freely through the latter. A chute 38 communicates at its upper end with the aperture 36 and rests at its lower end on the dial plate 34. The cross-section of the chute 38 is shown in Fig. 7; and it will be evident from this that a disc in the chute can slide freely down through it, cannot turn over and will be delivered on the dial plate 36 the same side up as it was upon entering the chute. A second chute 39 of similar construction carries discs from the aperture 37 to the dial plate 34, but is twisted 180° and thus delivers discs on the dial plate with that side up which was down when the discs entered the chute.

A slide 40 formed as the head of a hook shaped lever 41 is inset into the top of the table 35 to be flush therewith and to cover the aperture 36 so that no disc can fall through the aperture into the chute 38 unless the slide 40 is withdrawn as indicated in dotted lines in Fig. 4. The slide lever 41 is rigidly mounted on a vertical shaft 42 and is held yieldingly shut by a spring 43. A link 44 connected to the lever 41 at one end and to a solenoid 45 enable the solenoid, when energized, to retract the slide 40 and allow a disc to fall through the aperture 36 into the chute 38. There is no such slide between the turntable 32 and the chute 39. Any disc which is not permitted by the slide 40 to fall into the chute 38 will fall into the chute 39.

A photoelectric cell unit 46 and a light unit 47 are mounted above the table 32 in such fashion that light from the unit 47 focussed on a disc 19, in an aperture 33 located at the moment directly over the aperture 36, is reflected from the disc into the photoelectric cell unit 46. The unit 46 will then, as hereinafter described, according to the light reflecting capacity of the disc, cause or not cause the solenoid 45 to withdraw the slide 40 and allow the disc to fall into the chute 38.

Operation of the apparatus depends ultimately upon the fact that the copper oxide discs are coated, over the oxide film on one side only, with a non-copper colored metal, e. g. silver, so that the two faces of each disc have different capacities to reflect light. The apparatus therefore is not necessarily confined as to use, to copper oxide discs, but is employable whenever it is desirable to receive a helter-skelter supply of flat articles having their opposite sides of differing light reflecting capacity, and to deliver these all the same side up to some other apparatus or receiving means. In the particular arrangement herein disclosed as an illustrative embodiment of the invention, the embodiment per se includes the chutes 38 and 39, from which the discs are delivered all the same side up, but is not intended to include the dial plate 34, which is to be thought of as part of some other apparatus.

The operation performed by the apparatus comprises two principal steps. The first step is to take the irregularly oriented discs dumped into the hopper 20 and arrange, align and stack these in a column in the magazine tube 28, in which the discs are all mutually parallel, although with the silver side or the copper side of each uppermost at random. The second step is then to take discs one by one from the bottom of the column and deliver those which are silver side up, for example, to and through the chute 38, but those which are copper side up to and through the chute 39 in which they will be turned over, so that all are delivered to the dial plate 34 silver side up.

Flat laminar objects are difficult things to deal with mechanically to convert a random or helter-skelter heap of them into a neatly and uniformly stacked column. Where two or more lie mutually parallel and more or less overlapping, the friction between them is relatively large and they resist being brought into peripheral coincidence, or being shaken apart. Where such a group lies partly on and tilted by another of the objects, the misaligned object tends to refuse to slide wholly under and become aligned with the group over it, or to slide wholly out from under. In the apparatus described, the peculiar arrangement and motion of the hopper 20, legs 21 and vibrator 25 is such as to overcome such difficulties. The legs 21 are slanted backwards from the perpendicular, and therefore, when jerked back by the vibrator 25, carry the hopper 20 abruptly both downward and backward. The heap of unoriented discs in the hopper hangs by inertia, for an instant, unsupported, and then falls to meet the up and forward moving hopper. During the down and back-stroke of the hopper the discs are unaffected by the hopper, during the up and forward stroke the hopper tends to move the bottommost layer of discs forward and to jolt toward horizontality any which are not horizontal. Thus, by the repeated action of this peculiar vibratory motion of the hopper, the bottom discs of the pile in the hopper are fed out from under the pile in horizontal orientation and one, two or even three deep. Since the hopper bottom tilts at a slight angle toward the rear, these discs also move gradually toward the rear and so toward the outlet at the rear of the gate 26 and into the chute 27. The angle of the floor of this chute is sufficiently steep to bring the discs against the far wall of the tubular vertical snout of the chute before they begin to turn over. Hence, the discs fall flatwise into the magazine tube 28.

There is shown in Fig. 8, a somewhat generalized diagram of the electrical elements and their connections, described briefly above in terms of their functions only. Alternating electrical current is supplied from any suitable source, not shown, through a main power switch 48 to the primaries of transformers 49 and 50, the secondaries of which supply power to the light units, and also to two electrical networks generally indicated in Fig. 8 at 51 and 52 and shown in detail in Figs. 9 and 10. The particular structure, arrangement and detailed mode of operation of the devices 51 and 52 are no part of the present invention and so are not described in detail here. The particular devices illustrated in Figs. 9 and 10 are commercial photoelectric relay devices adapted by suitable connection only to the present purpose. Their mode of operation is believed to be sufficiently self-explanatory from the diagrams to those skilled in these arts. For present purposes it is sufficient that the device 51, shown in Fig. 9, acts to actuate the solenoid 45 to withdraw the slide 40 whenever a disc 19 in an aperture 30, positioned over the aperture 36, has its silver side up and exposed to be scanned by the photoelectric cell 46, while, if the disc be copper side up, the solenoid 45 will not be actuated. Similarly, the device 52 operates to prevent actuation of the vibrator whenever the passage of light from the source 30 to the photoelectric cell 31 through the apertures 29 in the tube 28 is obstructed by discs 19 piling up in the tube 28 above the apertures 29.

The particular embodiment is illustrative and may be varied and modified in various ways without departing from the spirit and scope of the invention as pointed out in the appended claims.

What is claimed is:

1. Apparatus to receive unordered laminar articles of different light reflecting capacity on the two flat sides thereof and deliver the same all with the same side up, the said apparatus comprising a hopper to receive a plurality of such articles unordered, means to vibrate the hopper to cause the articles to issue flatwise therefrom, a vertical tubular magazine to receive the articles from the hopper and contain the same in a stacked column, means to stop delivery by the hopper whenever the magazine contains more than a predetermined number of articles, conveyor means to carry away articles one at a time from the bottom of the magazine with the flat upper surface of each article exposed, photoelectric means to scan the articles on the conveyor means one at a time, delivery means to receive articles from the conveyor means and deliver the articles the same side up that they were in the conveyor means, second delivery means to receive articles from the conveyor means and turn them over and deliver them reversed from the position they were in in the conveyor means, and means actuated by the photoelectric means to cause an article in the conveyor means to enter and be delivered by the first named delivery means or the second delivery means according to which of the two flat sides of the article in the conveyor means is exposed to the photoelectric means.

2. Apparatus to receive unordered laminar articles of different light reflecting capacity on the two flat sides thereof and deliver the same all with the same side up, the said apparatus comprising a hopper to receive a plurality of such articles unordered, means to vibrate the hopper to cause the articles to issue flatwise therefrom, a vertical tubular magazine to receive the articles from the hopper and contain the same in a stacked column, means to cause the hopper to cease vibrating whenever the column of articles therein rises above a predetermined level, conveyor means to carry away articles one at a time from the bottom of the magazine with the flat upper surface of each article exposed, photoelectric means to scan the articles on the conveyor means one at a time, delivery means to receive articles from the conveyor means and deliver the articles the same side up that they were in the conveyor means, second delivery means to receive articles from the conveyor means and turn them over and deliver them reversed from the position they were in in the conveyor means, and means actuated by the photoelectric means to cause an article in the conveyor means to enter and be delivered by the first named delivery means or the second delivery means according to which of the two flat sides of the article in the conveyor means is exposed to the photoelectric means.

3. Apparatus to receive unordered laminar articles of different light reflecting capacity on the two flat sides thereof and deliver the same all with the same side up, the said apparatus comprising a hopper to receive a plurality of such articles unordered, means to vibrate the hopper to cause the articles to issue flatwise therefrom, a vertical tubular magazine to receive the articles from the hopper and contain the same in a stacked column, means to cause the hopper to cease vibrating whenever the column of articles therein rises above a predetermined level, conveyor means to carry away articles one at a time from the bottom of the magazine with the flat upper surface of each article exposed, photoelectric means to scan the articles on the conveyor means one at a time, delivery means to receive articles from the conveyor means and deliver the articles the same side up that they were in the conveyor means, second delivery means to receive articles from the conveyor means and turn them over and deliver them reversed from the position they were in the conveyor means, and means actuable by the photoelectric means to release an article from the conveyor means into the first named delivery means if the article in the conveyor means presents a predetermined face to the photoelectric means.

4. In an apparatus to receive unordered laminar articles of different light reflecting capacity on the two flat sides thereof and to deliver the same flatwise and in two sequences having the articles all the same side up in one sequence and opposite sides up in the two sequences, means to receive a plurality of such articles in wholly unordered orientation and to deliver the same in a horizontal sequence of horizontally positioned articles with one side or the other up by chance and at chance controlled intervals of time, means to convert the said sequence into a dense storage sequence, means to control the action of the first named means in accordance with the number of articles present in the dense storage sequence, means to remove articles one by one from the storage sequence in a temporally regular sequence, photoelectric means to scan the temporally regular sequence, and means controlled by the photoelectric means to switch articles from the temporally regular sequence to one or other of two farther sequences according to orientation of the articles when scanned.

5. Apparatus to receive unordered laminar articles of different light reflecting capacity on the two flat sides thereof and deliver the same all with the same side up, the said apparatus comprising a hopper to receive a plurality of such articles unordered and having a substantially horizontal flat bottom and an outlet at one edge of the bottom, resilient legs supporting the hopper and slanting away from the outlet, electrical vibrator means to move the top of one leg away from the outlet and to release the same to return and thereby move the hopper first back and down and then forward and up in repeated cycles of motion to cause the articles to issue flatwise therefrom, a vertical tubular magazine to receive the articles from the hopper and contain the same in a stacked column, means to cause the hopper to cease vibrating whenever the column of articles in the magazine rises above a predetermined level, conveyor means to carry away articles one at a time from the bottom of the magazine with the flat upper surface of each article exposed, photoelectric means to scan the articles on the conveyor means one at a time, delivery means to receive articles from the conveyor means and deliver the articles the same side up that they were in the conveyor means, second delivery means to receive articles from the conveyor means and turn them over and deliver them reversed from the position they were in in the conveyor means, and means actuated by the photoelectric means to cause an article in the conveyor means to enter and be delivered by the first named delivery means or the second delivery means according to which of the two flat sides of the article in the conveyor means is exposed to the photoelectric means.

JOHN A. DECKER.
DONALD P. WILKES.